United States Patent [19]

Gastaldi

[11] 4,233,114

[45] Nov. 11, 1980

[54] SPRAY DRYER

[76] Inventor: Francesco Saverio Maria Gastaldi, Via G. Modena, 20, Milan, Italy

[21] Appl. No.: 32,961

[22] Filed: Apr. 24, 1979

Related U.S. Application Data

[63] Continuation of Ser. No. 856,778, Dec. 2, 1977, abandoned, which is a continuation of Ser. No. 633,089, Nov. 18, 1975, abandoned.

[30] Foreign Application Priority Data

Nov. 18, 1974 [IT] Italy .............................. 29525 A/74

[51] Int. Cl.[2] .............................................. B01D 1/18

[52] U.S. Cl. .................................... 159/4 D; 159/4 R

[58] Field of Search ............................... 159/4 D, 4 R

[56] References Cited

U.S. PATENT DOCUMENTS

| | | | |
|---|---|---|---|
| 3,414,980 | 12/1968 | Nezbed | 159/4 D |
| 3,423,173 | 1/1969 | McFarlin et al. | 159/4 D |

*Primary Examiner*—Norman Yudkoff

*Attorney, Agent, or Firm*—Stevens, Davis, Miller & Mosher

[57] ABSTRACT

Spray dryer in which a hot gas and a shower of a solution, suspension or paste are introduced in the upper section of a closed chamber and moved with laminar flow towards the side exit of the gas located in the lower section of the chamber which is prolongued beyond said exit for a certain length.

1 Claim, 1 Drawing Figure

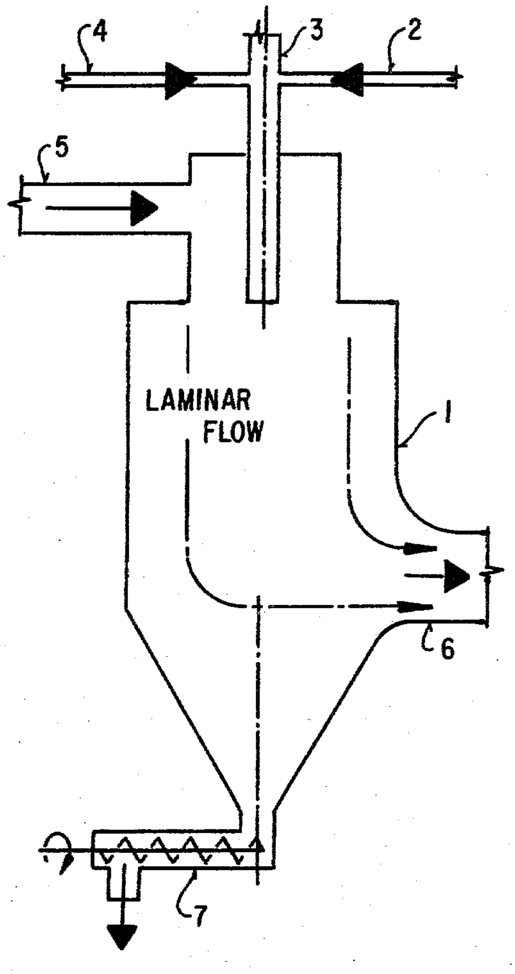
4
3
2
5
LAMINAR
FLOW
1
6
7

SPRAY DRYER

This is a continuation of application Ser. No. 856,778 now abandoned filed Dec. 2, 1977 which in turn is a continuation of application Ser. No. 633,089 filed Nov. 18, 1975 and now abandoned.

The present invention relates to an improved dryer of the direct drying or spray type.

This dryer is illustrated in the attached single FIGURE of drawings which is a sectional elevational view.

The known dryers of the above stated type are in general made up of a cylindrical chamber 1 inside which a hot gas circulates under turbulent flow conditions and from whose top falls a shower of finely divided particles obtained for example, by means of spray nozzles 3 fed by a solution, suspension, mud or paste through a solution feed 4 and an air feed 2.

Since the dispersed particles have extremely small dimensions up to 20 micron, they present large surface areas for a given unit weight; hence drying takes place in an extremely short time interval.

However these known dryers present a number of inconveniences, as for example, it is not always possible to achieve perfect contact between the particles and hot gas and it is difficult to obtain uniformly sized particles. In particular the larger sized particles do not dry completely, hence they wet the particles which have already dried, giving rise to lumps and agglomerates and in addition they adhere to the walls of the chamber, or to the depowdering devices, for example cyclones impeding their proper operation.

The dryer of this invention avoids the previously stated inconveniences since it makes it possible to isolate particles which are only partially dried the particles, thus preventing them from disturbing the operation of the dryer.

We have found that to achieve these aims it is necessary for the hot gas, entering through entrance 5 and the shower of particles to move equi-currently in laminar, rather than in turbulent flow, towards the base, and that the exit 6 for the gas, carrying the dried powder in suspension, be located at the side with respect to the chamber 1, and preferably at right angles with respect to the vertical axis of the drying chamber 1, and that the said chamber 1 be extended for a certain distance, in the order of one chamber diameter, below the level of the gas exit point. In addition the gas outlet is preferably connected to the dryer with an ample fitting.

The particles which are not carried over by the gas current, and that is, the heavier ones due to their larger dimension, or due to their higher liquid content, fall in the said terminal area below the gas exit where they are collected by collector 7 without disturbing the drying process. The particles carried over by the gas exiting from the chamber are separated from it by means of the known de-powdering devices.

I claim:

1. A direct drying spray dryer in which the substance to be dried is dispersed from the top of a drying chamber and a hot gas circulates from an upper portion towards a lower portion of the chamber, said dryer consisting of:

(a) a vertically extending cylindrical chamber comprising a lower conical section, a central section of a first diameter, and an upper section of a diameter less than that of the first diameter and having on its top a downwardly and vertically extending inflow nozzle means for the substance to be dried, said nozzle means being coaxial with the cylindrical chamber and terminating in an end at the bottom of the upper section within the chamber and spaced from the top thereof, said end being directed directly toward the center of the bottom of the chamber, a horizontal solution feed pipe above the top and opening directly into one side of the nozzle means, and a horizontal air feed pipe coaxial with the solution feed pipe, above the top, and opening directly into the other side of the nozzle means,;

(b) an entrance for hot gas opening into the side of the upper section of the chamber immediately adjacent and just below the top thereof in a direction directly toward the longitudinal axis of the nozzle means, said entrance being between the end of the nozzle means and the top of the chamber, and means for inducing a gas flow in the chamber from the upper section thereof;

(c) an exit for dried particles originating at and extending from the side of the chamber at an angle of about 90° to the longitudinal axis of the chamber and spaced above the bottom thereof;

(d) a bottom portion on the chamber below said exit having a length of about a chamber diameter for collecting large sized particles;

(e) means on said bottom portion for removal of said large size particles; and (f) said entrance, said nozzle means and said exit being fluidly connected to each other only through said chamber.

* * * * *